United States Patent [19]

Damico et al.

[11] 4,344,144

[45] Aug. 10, 1982

[54] APPARATUS FOR CREATING GAS FLOW CYCLES

[75] Inventors: Pierre Damico, Villepreux; Georges Jaco, Maurepas, both of France

[73] Assignee: Intertechnique, Plaisir, France

[21] Appl. No.: 145,841

[22] Filed: May 1, 1980

[30] Foreign Application Priority Data

May 2, 1979 [FR] France ............................... 79 11071

[51] Int. Cl.[3] .................... A16M 17/00; G05D 11/00

[52] U.S. Cl. .............................. 364/510; 128/204.22; 364/413; 73/199

[58] Field of Search ....................... 364/413, 415, 510; 128/204.21, 204.22, 205.11, 205.24, 205.25, 204.18, 204.19; 73/3, 23, 199

[56] References Cited

U.S. PATENT DOCUMENTS 3,878,376 4/1975 Sholes, Jr. et al. ............ 364/558 X
3,896,792 7/1975 Vali et al. ........................ 73/23 X
3,972,327 8/1976 Ernst et al. .................... 128/204.21
3,977,394 8/1976 Jones et al. .................... 364/415 X
3,991,304 11/1976 Hillsman ........................... 364/415
4,109,509 8/1978 Cramer et al. ............ 128/204.22 X
4,121,578 10/1978 Torzala ..................... 128/205.11 X
4,215,409 7/1980 Strowe ...................... 128/204.22 X
4,233,972 11/1980 Hauff et al. ............... 128/205.25 X
4,236,546 12/1980 Manley et al. ................. 364/413 X

*Primary Examiner*—Edward J. Wise
*Attorney, Agent, or Firm*—Cushman, Darby & Cushman

[57] ABSTRACT

An apparatus for creating gas flow cycles comprises a housing defining a chamber (80) provided with gas functions and a passage (76) for connection with an equipment to be tested. A unit movable in the housing throttles the passage. The position of the unit (75) is controlled by electrical signals received from a control unit. Sensors supply electrical signals representative of the position of the mobile assembly and of the pressure. The junctions are provided for connection with gas sources at different pneumatic pressures through solenoid valves.

9 Claims, 2 Drawing Figures

APPARATUS FOR CREATING GAS FLOW CYCLES

BACKGROUND AND SUMMARY OF THE INVENTION

The present invention relates to an apparatus for creating gas pressure and/or flow cycles and has an important application, although not exclusive, in testing units which, in operation, are subjected to pressure and flow cycles such as breathing systems or regulators.

At the present time, breathing systems are checked and tested with apparatuses where the operating conditions are manually adjusted. Such tests are long and do not permit a sufficient variety of operating cycles to be simulated.

It is an object of the invention to provide an apparatus for creating reproducible cycles of a wide variety and for applying them to units placed in any environment, particularly altimetric or pressurized environments.

According to the invention, there is provided an apparatus for creating predetermined gas flow cycles, comprising:

a housing limiting an inner chamber provided with a gas flow opening, a movable unit having a throttling member cooperating with said opening for defining a passage having a cross-sectional flow area depending on the position of said movable unit, electrically actuatable valve means for communicating said chamber to either of a plurality of gas sources at predetermined different pressures, electrical motor-means for controlling the position of said movable unit, and electrical sensor means operatively associated with said movable unit to deliver an electric signal representative of the location of said unit in the housing.

One of the gas pressure sources may be a vacuum pump; it may also be a pressurized gas source, one or more pressure reducers supplying a constant but adjustable pressure being placed between the pressurized gas source and the solenoid valve.

Operation of the apparatus will preferably be controlled by a control and data processing unit which will typically be digital and include a CPU which may be a microprocessor. The CPU or central processing unit will receive the signals from position-detecting electromagnetic sensor means and possibly from pressure sensors provided on the apparatus or the unit to be tested.

A particularly interesting application of the invention is for testing breathing units. The unit will thus be generally placed in a sealed box where an air pressure different from the normal atmospheric pressure may be provided, for example less than atmospheric pressure (in the case of breathing equipment for aircraft crews) or higher than atmospheric pressure (in the case particularly of diving equipment).

The apparatus is also suitable for use in the medical field for simulating respiratory cycles which may have been measured when a patient is in satisfactory conditions and then applying said cycles to a patient during abnormal conditions, for instance during a surgical operation; it may also provide assistance in emphysema.

The invention will be better understood from the following description of a particular embodiment, given by way of example. The description refers to the accompanying drawings.

SHORT DESCRIPTION OF THE DRAWINGS

DETAILED DESCRIPTION OF AN EMBODIMENT

Figure 1:
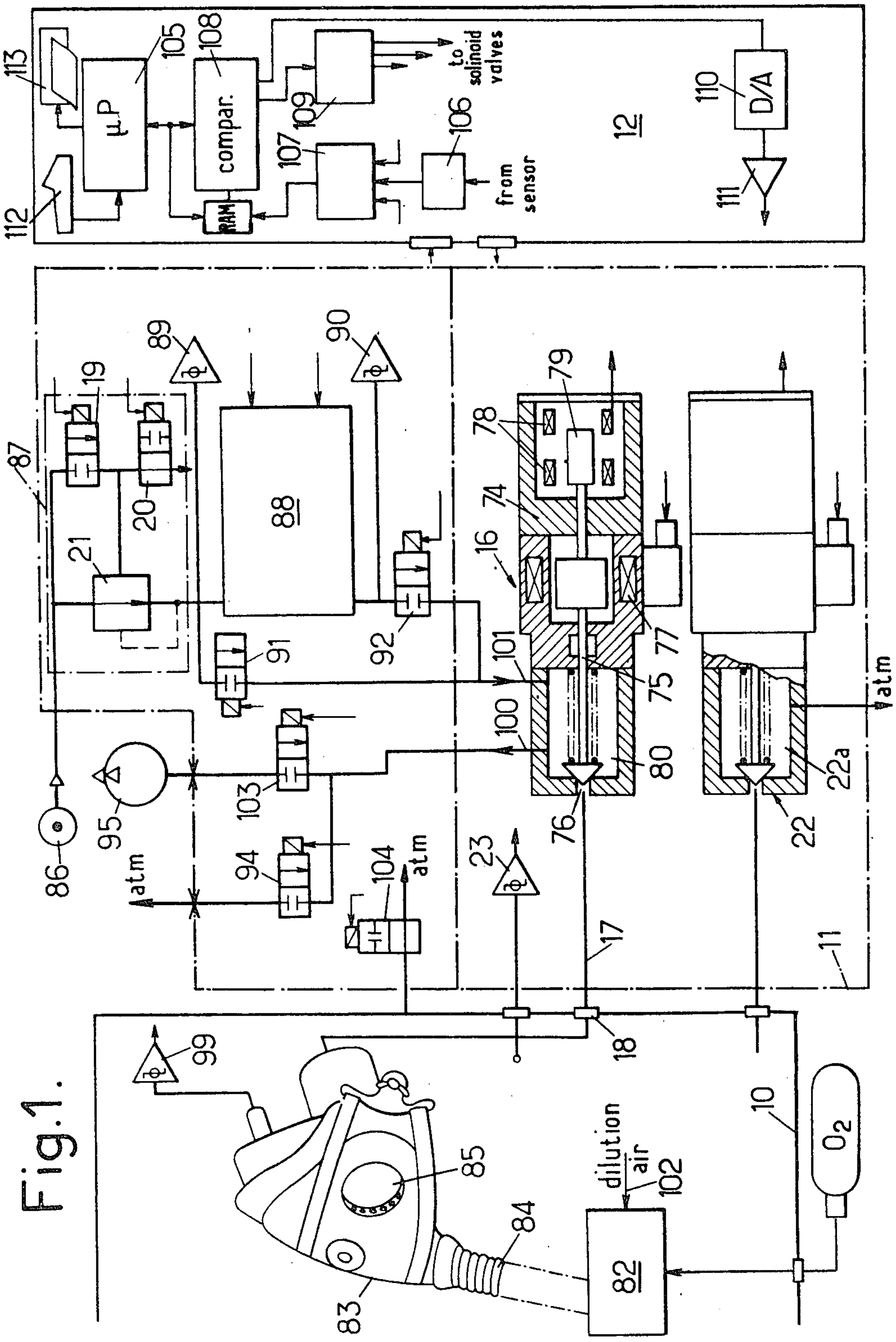
FIG. 1 is a sketch illustrating the general construction of the apparatus of the invention.

Referring to FIG. 1 there is shown an apparatus for testing masks and demand oxygen regulators, in a controlled environment, which may be regarded as comprising an environment-simulating box 10, an electropneumatic unit 11 and a control unit 12.

Box 10 may be of conventional construction. The box shown schematically is intended to receive the equipment to be tested, here a mask 83 having an expiratory valve 85 and connected to a demand regulator 82 by a conventional flexible tube 84. Mask 83 is placed on a shape simulating the face of a wearer. The wall of the box is provided with electrical and pneumatic connectors passing therethrough, whose function will appear further on.

The construction of the electropneumatic unit 11 will depend on the tests to be carried out. It comprises a cycle-creating device 16, intended to be connected, by means of a pipe 17 and a connector 18 passing through the box wall, to the equipment to be tested, here mask 83 and regulator 88.

Device 16 comprises, in a housing 74 made from several parts assembled together and defining a chamber 80 having supply connections 100 and 101 and a passage 76 opening into pipe 17:

a movable assembly 75 comprising a metering member for throttling passage 76; the throttling element is illustrated in FIG. 1 as a needle, but other types of elements, such as a spool, may be used.

electrically actuatable means 77 for controlling the position of the throttling member; in FIG. 1, means 77 comprises an electromagnet whose action is directly related to the value of the electric current which flows therethrough; other types of control can be used (for example a step-by-step motor;

electrical sensor means for detecting the position of assembly 75, formed for example by detection coils 78 placed in the housing, supplying an electric signal which depends on the position of an armature 79 secured to the movable assembly 75.

A linear relationship between the position of mobile assembly 75 and the current which flows through electromagnetic means 77 is not essential, but the position must depend practically only on the current or on the electric voltage applied to means 77, under normal conditions of use.

Connections 100 and 101 are connected, through circuits provided with electrically controlled closure means, to gas sources at different pressures, for setting the pressure in chamber 80 at a specific and selectable value.

The apparatus of FIG. 1 is for testing masks either under a partial vacuum (altimetric tests), or under an overpressure (tests in a pressurized environment). For that purpose, connection 100 is provided for connection by a circuit either to a vacuum source, or to the atmospheric pressure, whereas connection 101 is provided for connection to a pressure circuit.

The first circuit comprises a vacuum pump 95, separated from connection 100 by a solenoid valve 103, and an atmospheric vent separated from connection 100 by a solenoid valve 94.

The circuit associated with connection 101 comprises starting from a high pressure (for example 250 bars) oxygen-supply cylinder 86, two cascade-mounted pressure reducers 87 and 88, typically having the same construction. Each of the pressure reducers 87 and 88 is provided with a respective output pressure sensor 89 or 90. Two solenoid valves 91 and 92 are arranged to connect connection 101 either to the output of pressure reducer assembly 87 (at a pressure of 20 bars for example) or to the output of pressure reducer assembly 88 (at a pressure of 1 bar above atmospheric pressure for example).

Solenoid valves 91 and 92 may consequently maintain a predetermined pressure in chamber 80, higher than normal atmospheric pressure at sea level.

Only the construction of pressure reducer assembly 87 has been shown in detail in the figure. It comprises a pressure reducing servo valve 21, piloted by two solenoid valves 19 and 20 having an open and a closed position.

Figure 2:
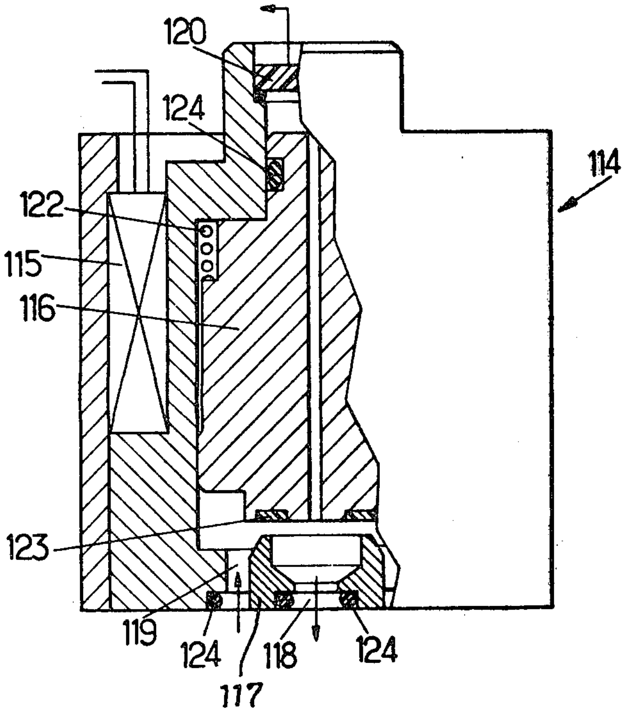
FIG. 2 is a simplified sectional view of a balanced solenoid valve suitable for use in the apparatus of FIG. 1.

It is important that the pressure delivered by the pressure reducing assembly 87 be constant, for the relation between the rate of flow and the cross-sectional area limited by the throttling element in passage 76 to be accurately retained. For that purpose, solenoid valves may be substituted for the pressure reducing assemblies 87, 88, only if pressure balanced. Referring to FIG. 2, there is shown a pressure-balanced servo valve 114 of a type which is closed when de-energized, illustrated in energized condition. Valve 114 comprises a generally cylindrical housing carrying an electromagnetic coil 115 formed with an internal cylindrical chamber which slidably receives a spool 116. One end wall of the chamber is provided with a seat member 117 separating an annular inlet 119 from a central outlet 118. The other end wall of the chamber is formed with a bore of reduced diameter which slidably receives a projection of spool 116 whose diameter is equal to that of seat 117. A piezo electric sensor 120 is sealingly secured in the bore and is consequently subjected to the pressure which prevails in the bore. A central passageway 121 in the spool 116 applies the outlet pressure to sensor 120. Spool 116, of ferromagnetic material, constitutes the armature of the electromagnetic control system of the valve. Energization of coil 115 forces spool 116 away from its seat, against the return force of a spring 122, into the position shown in FIG. 2. A flat seal 123 of a material resistant to creep under high pressure, for instance of "torlon", and O-rings 124 are provided for sealing purposes.

The apparatus illustrated in FIG. 1 comprises furthermore a device for stabilizing the pressure which prevails in box 10 by adjustment of the cross sectional flow area between the box and the surrounding atmosphere. Device 22 is similar to device 16. However its chamber *22a* only comprises a single connection, opening to the atmosphere. A pressure sensor 23 is again provided for supplying a signal representative of the pressure which prevails in box 10.

The apparatus further comprises the control unit 12 whose essential element is a microprocessor 105 which receives the output signal from sensors 23, 89, 90, 78 (and possibly from additional control sensors measuring the pressures in chambers 80 and *22a*) and which supplies, through power amplifiers, control currents to the electromagnets of devices 16 and 22 as well as to the solenoid valves.

The apparatus which has been described enables to impress cyclical tests on an equipment placed in box 10; that equipment will be assumed to comprise mask 83 and associated regulator 82 having a dilution air inlet 102.

It will first be assumed that it is desired to carry out altimetric tests; then solenoid valve 94 remains permanently closed. For simulating a breathing cycle, the breathing-in phase is represented by creating in the mask a depression measured by means of a sensor 99 by drawing an air flow through passage 76. The control unit causes solenoid valve 103 to open, to provide in chamber 80 a depression corresponding to the vacuum created by the vacuum pump 95. Then, the control unit actuates the movable assembly of device 16 so as to provide a flow cross-sectional area varying as a function of time, according to the flow-pressure cycle to be simulated. The travel of the movable assembly 75 from its rest position is represented by the signal supplied by the position sensor supplying an input comparator 108 of the control unit through an A/D converter 106. Since the pressure which prevails in box 10, measured by sensor 23, is maintained constant by modulating or metering the flow area limited by the throttle member of device 22, the flow rate through passage 76 may be metered by control of the flow cross-sectional area, in accordance with a time variation curve previously stored in control unit 12. The variation as a function of time of the cross sectional area will itself be controlled as a function of the cycle to be simulated. The system may be considered as in closed loop since the travel of the movable assembly 75 from its rest position is represented by the signal supplied by the position sensor 78.

At the end of the breathing-in period, the control unit causes solenoid valve 103 to close and solenoid valve 92 to open. Thus, a predetermined pressure is established in chamber 80. The piloted pressure reducing assembly 88 then sends a counter-pressure into chamber 80. This counter-pressure conveyed through passage 76 causes the expiration valve 85 to open. The cycle is thus reproduced during the time provided for the tests.

By switching electromagnetic valves 91 and 92 and by modulating the position of movable assembly 75, the apparatus may simulate sine-shaped cycles, step-by-step pressure or flow variations or even Watt's diagram (simulating the breathing-in breathing-out cycle of a mask-wearer).

For tests under normal atmospheric pressure, device 22 may be left closed, the box being connected to the atmosphere through an additional solenoid valve 104.

Finally, for tests in a pressurized environment, vacuum pump 95 may be stopped; the pressure in chamber 80 is then controlled by controlling solenoid valves 94 and 92 (or 94 and 91 if a high pressure is required) while solenoid valve 103 remains closed.

The control unit 12 may consist of components which are currently available. As illustrated in FIG. 1, the microprocessor unit 105 may consist of a zilog Z80 associated with a 2214 RAM, and a 2708 ROM for storing the programs. The mass memory may consist of floppy disks.

The electric signals from pressure sensors 23, 99, 89, 90 and 78 are converted by A/D converters into digital form. Since a precision of about 1% will generally be sufficient, 8-bit converters will typically be used. While multiplexing may be provided, it may be preferable to provide a number of converters equal to the maximum number of sensors which may be used simultaneously. A single converter 106 has been illustrated for more clarity.

The outputs of all converters are applied to a coupling unit 107 for writing the values sensed by the sensors into the RAM memory. The actual values of the parameters to be controlled are compared in comparator 108 with set values provided by the MPU 105. The values of the parameters to be tested (pressure in mask 83 for instance) are stored in the mass memory.

Control of the solenoid valves may be quite straightforward, since it may be achieved by logic levels from an output coupling unit 109. On the other hand, proportional control of each electromagnetic motor 77 requires a D/A converter 110 and a power amplifier 111.

Program introduction may be made by an alphanumeric keyboard 112 and display of the results by a printer 113.

For testing oxygen breathing systems it may be sufficient to make a measurement each 0.1 sec; the time period between two measurements is then of the same order as the response time of the solenoid valves. The test results will then consist of a plot of the pressure read by sensor 99 vs. the flow rate, which is derived from the cross-sectional area of opening 76 using a memorized calibration chart which was previously prepared and may periodically be verified.

When the apparatus is used for breathing assistance, it may be programmed based on data previously collected on the patient. Its advantages then include adaptability to the particular requirements of a patient, whether a child or an adult, and the disease. For instance, in case of emphysema, the apparatus may be used to feed pressurized air during inspiration, while maintaining expiration to atmospheric pressure.

As is self evident and as emerges already from the foregoing, the invention is in no way limited to those of its methods of application and embodiments which have been more especially contemplated; it encompasses, on the contrary, all modifications.

I claim:

1. An apparatus for producing predetermined gas flow cycles comprising in combination:

a housing defining an inner chamber including a gas flow opening;

a movable unit having a throttling member which cooperates with said gas flow opening so that movement of said throttling member will effect a variance of the cross-sectional area of said gas flow opening;

at least one valve means for selectively coupling in response to a first control signal said chamber to at least one of a plurality of gas sources having predetermined differing pressures;

motor means in operative communication with said movable unit for controlling the position of said movable unit in response to a second control signal;

sensor means operatively associated with said movable unit for detecting the position of said movable unit in said housing and for transmitting a position signal representative of said position; and control means for generating at least said first and second control signals and for receiving at least said position signal to effect predetermined movement of said valve means and said throttling member so that predetermined cyclical gas flow through said gas flow opening is produced.

2. An apparatus as in claim 1, wherein at least one of said gas sources comprises a pressure balanced electromagnetically actuated valve having:

a housing defining an inner bore formed with a first portion of a first diameter and a second portion of a second smaller diameter;

a valve spool having a first and a second portion dimensioned for being slidably received in said first and second portions of said bore;

a seat member located coaxially with said bore, formed with a central outlet and defining with said bore an annular inlet, said seat being arranged to sealingly receive the end face of the second portion of said spool along a circular line substantially of the same diameter as said first portion;

passage means in said spool for communicating the opposed end faces thereof; and electromagnetic means for moving said spool between a position where it is sealingly applied against said seat member and a position away from said seat member.

3. An apparatus as in claims 1 or 2 wherein said at least one valve means is a solenoid valve having an open position and a closed position.

4. An apparatus as in claim 3 wherein one of said plurality of gas pressure sources includes a vacuum pump.

5. An apparatus as in claim 3 wherein one of said plurality of gas pressure sources includes gas storage means for storing gas under pressure, and at least one pressure reducing apparatus located between said gas storage means and said solenoid valve associated therewith.

6. An apparatus as in claim 3, wherein said solenoid valve is pressure balanced.

7. An apparatus as in claim 1, further comprising:

enclosure means for providing a gas tight environment in which equipment is tested for flow rate-pressure differential response; and means for defining a path of gas flow between said enclosure means and said gas flow opening.

8. An apparatus according to claim 7 further comprising pressure sensing means in operative association with said equipment and connected to said control means for detecting the pressure at a location in said equipment and for generating a pressure signal representative of said pressure thereat.

9. An apparatus according to claim 1, wherein said control means includes electrical storage means for storing a predetermined flow cycle to be simulated, and output signal generating means in communication with said storage means for controlling said motor means and said valve means to effect cyclical operation thereof to simulate said stored predetermined flow cycle.

* * * * *